United States Patent
Fradette et al.

(10) Patent No.: US 7,514,056 B2
(45) Date of Patent: Apr. 7, 2009

(54) PROCESS AND INSTALLATION FOR THE FRACTIONATION OF AIR INTO SPECIFIC GASES

(75) Inventors: Sylvie Fradette, Pintendre (CA); Philippe Paelinck, Reims (FR)

(73) Assignee: CO2 Solution Inc., Quebec (CA)

(*) Notice: Subject to any disclaimer, the term of this patent is extended or adjusted under 35 U.S.C. 154(b) by 318 days.

(21) Appl. No.: 11/350,288

(22) Filed: Feb. 7, 2006

(65) Prior Publication Data
US 2006/0213224 A1     Sep. 28, 2006

Related U.S. Application Data

(60) Provisional application No. 60/650,169, filed on Feb. 7, 2005.

(51) Int. Cl.
| | |
|---|---|
| *B01D 53/62* | (2006.01) |
| *B01D 53/74* | (2006.01) |
| *B01D 53/78* | (2006.01) |
| *C01B 13/00* | (2006.01) |
| *C01B 21/04* | (2006.01) |
| *F25J 3/00* | (2006.01) |

(52) U.S. Cl. ............... 423/220; 423/351; 423/579; 422/187; 422/255; 435/266; 435/289.1; 62/600; 62/615; 62/640; 62/643; 96/243

(58) Field of Classification Search .......... 422/187, 422/255; 423/220, 351, 579; 435/266, 289.1; 62/600, 615, 640, 643; 96/243

See application file for complete search history.

(56) References Cited

U.S. PATENT DOCUMENTS

| | | | |
|---|---|---|---|
| 6,475,382 | B2 | 11/2002 | Parent |
| 6,524,843 | B1 | 2/2003 | Blais et al. |
| 6,547,854 | B1 | 4/2003 | Gray et al. |
| 6,602,703 | B2 | 8/2003 | Dutil |
| 6,846,584 | B2 | 1/2005 | Dutil et al. |
| 6,908,507 | B2 | 6/2005 | Lalande et al. |
| 6,946,288 | B2 | 9/2005 | Blais et al. |
| 2002/0095951 | A1* | 7/2002 | Ha ............................ 62/643 |
| 2003/0033832 | A1* | 2/2003 | Massimo et al. ............. 62/643 |
| 2005/0138960 | A1* | 6/2005 | Prosser et al. ................ 62/650 |
| 2006/0010912 | A1* | 1/2006 | Brugerolle et al. ........... 62/643 |

OTHER PUBLICATIONS

U.S. Appl. No. 10/195,848, filed Jan. 30, 2003, Parent et al.
U.S. Appl. No. 10/353,171, filed Jul. 31, 2003, Dutil.
U.S. Appl. No. 10/408,663, filed Feb. 12, 2004, Dutil.
Soong, Y et al., "Novel amine enriched solid sorbents for carbon dioxide capture".

* cited by examiner

*Primary Examiner*—Timothy C Vanoy

(57) ABSTRACT

In order to reduce incoming atmospheric carbon dioxide levels in compressed air prior to cryogenic distillation, a water spray cooling tower equipped with biocatalytic packing, or fed with absorptive reagents, is used to convert gaseous carbon dioxide into bicarbonate ions which dissolve in the cooling water. The hydration reaction and refrigeration occur synergistically. The bicarbonate ions are subsequently removed from the solution using the heat from the compressed air in a regenerator re-boiler unit, and then fed to a percolation cooling tower for releasing $CO_2$ and cooling.

20 Claims, 2 Drawing Sheets

PROCESS AND INSTALLATION FOR THE FRACTIONATION OF AIR INTO SPECIFIC GASES

CROSS-REFERENCE TO RELATED APPLICATION

This application claims priority from U.S. Provisional Patent Application No. 60/650,169 filed Feb. 7, 2005.

FIELD OF THE INVENTION

The present invention generally relates to processes and installations for the fractionation of air into specific gas such as nitrogen and oxygen. More particularly, it concerns a process for the combined cooling and removal of carbon dioxide from compressed air prior to its cryogenic distillation.

BACKGROUND OF THE INVENTION

Installations for the production of large quantities of oxygen and/or nitrogen by air distillation often comprise a spray refrigeration tower for cooling the compressed air so as to lower its temperature prior to its entry into adsorbent chambers for the removal of carbon dioxide and water, which are otherwise detrimental to the operation of the distillation cold box.

In the usual technique, all of the steam water (usually at saturation conditions) and carbon dioxide in the range of 270 to 350 ppmV are removed in a system of two or more adsorbent chambers loaded with special activated alumina and/or a molecular sieve. This technique has the drawback of necessitating large and expensive pressure vessels, costly adsorbents and high energy input for removing the carbon dioxide present in the air to the very low concentration levels required for the correct operation of the distillation cold box. Also, due to the general increase of carbon dioxide concentration in atmospheric air, especially in industrial areas, many existing installed units may face operation problems due to capacity limitations of their adsorbent chambers which may necessitate large revamping investments.

Certain techniques also exist for removing $CO_2$ from a $CO_2$ containing gas. For example, U.S. Pat. No. 6,524,843 (BLAIS et al.) discloses a bioreactor using immobilized carbonic anhydrase to capture $CO_2$ from a gaseous effluent. This patent teaches that the bioreactor is a packed tower reactor to which a $CO_2$-containing gas stream is fed. The solvent enters the packed tower and flows downwards while absorbing the dissolved $CO_2$.

There is thus presently a need for a more efficient and less costly process and apparatus for the production of oxygen and/or nitrogen by air distillation.

SUMMARY OF THE INVENTION

The present invention provides a process and an installation that satisfy the above-mentioned need.

In accordance with the present invention, there is provided a process for fractioning air, including the steps of:
a) providing compressed air;
b) simultaneously cooling the compressed air and reducing $CO_2$ contained therein, by
providing a spray tower;
providing the spray tower with catalyzing means for promoting the hydration reaction of dissolved $CO_2$ into at least bicarbonate ions and hydrogen ions, thereby producing treated air with a reduced amount of $CO_2$ and an ion rich solution containing at least bicarbonate ions and hydrogen ions; and
feeding the compressed air into the spray tower while spraying a cooling solvent therein; and
c) feeding the treated air to a cold distillation apparatus for fractioning the treated air into at least one gas selected from the group consisting of nitrogen and oxygen.

In accordance with a preferred aspect of the invention, the catalyzing means are selected from biocatalysts such as carbonic anhydrase, and absorptive chemical reagents such as amine-based absorbents.

In accordance with another preferred aspect of the invention, the ion rich solution is regenerated into $CO_2$. The regeneration of the ion rich solution is preferably performed in a regenerator and/or a percolation cooling tower, which are preferably equipped with an immobilized biocatalyst in order to enhance their conversion performance.

In accordance with another preferred embodiment, the spray tower further includes a bottom stage and a top stage as well as a first spray inlet and a second spray inlet for spraying the cooling solvent into the respective stages. The top stage is provided with the catalyzing means. In this embodiment, step b) of the process includes the sub-steps of:
initially cooling the compressed air with the cooling solvent of the first spray inlet in the bottom stage, thereby producing a pre-treated air and a weak ion solution at a first liquid outlet, and
cooling the pre-treated air while removing $CO_2$ therefrom with the cooling solvent of the second spray inlet in the top stage, the catalyzing means catalyzing the hydration reaction of $CO_2$, thereby producing the treated air with a reduced amount of $CO_2$ and the ion rich solution at a second liquid outlet.

In accordance with the present invention, there is also provided an installation for fractioning air, comprising:
a compressor for compressing the air to produce compressed air;
a spray tower for simultaneously cooling the compressed air and reducing $CO_2$ contained therein, the spray tower having an air inlet for receiving the compressed air, at least one liquid spray inlet for receiving and spraying a cooling solvent to contact and cool the compressed air; the spray tower also comprising catalyzing means for promoting the hydration reaction of dissolved $CO_2$ into at least bicarbonate ions and hydrogen ions, thereby producing treated air having a reduced amount of CO2 at a gas outlet, and an ion rich solution at at least one liquid outlet;
a cold distillation apparatus for receiving the treated air, the cold distillation apparatus fractioning the treated air into at least one gas selected from the group consisting of nitrogen and oxygen.

The installation may also include a percolation tower and/or other means of regenerating the ion rich solution such as a regenerator or a heat exchanger.

BRIEF DESCRIPTION OF THE DRAWINGS

The process and installation of the combined cooling and $CO_2$ removal, according to the present invention are represented in FIGS. 1 and 2.

DESCRIPTION OF PREFERRED EMBODIMENTS

Preferred embodiments of the installation and process will be described hereafter.

The invention provides an installation and a process that enable air containing $CO_2$ to be treated in order to reduce the amount of $CO_2$ contained therein while substantially improving the efficiency of fractioning the air into various sub-components, more namely into nitrogen and oxygen.

The Installation

Figure 1:
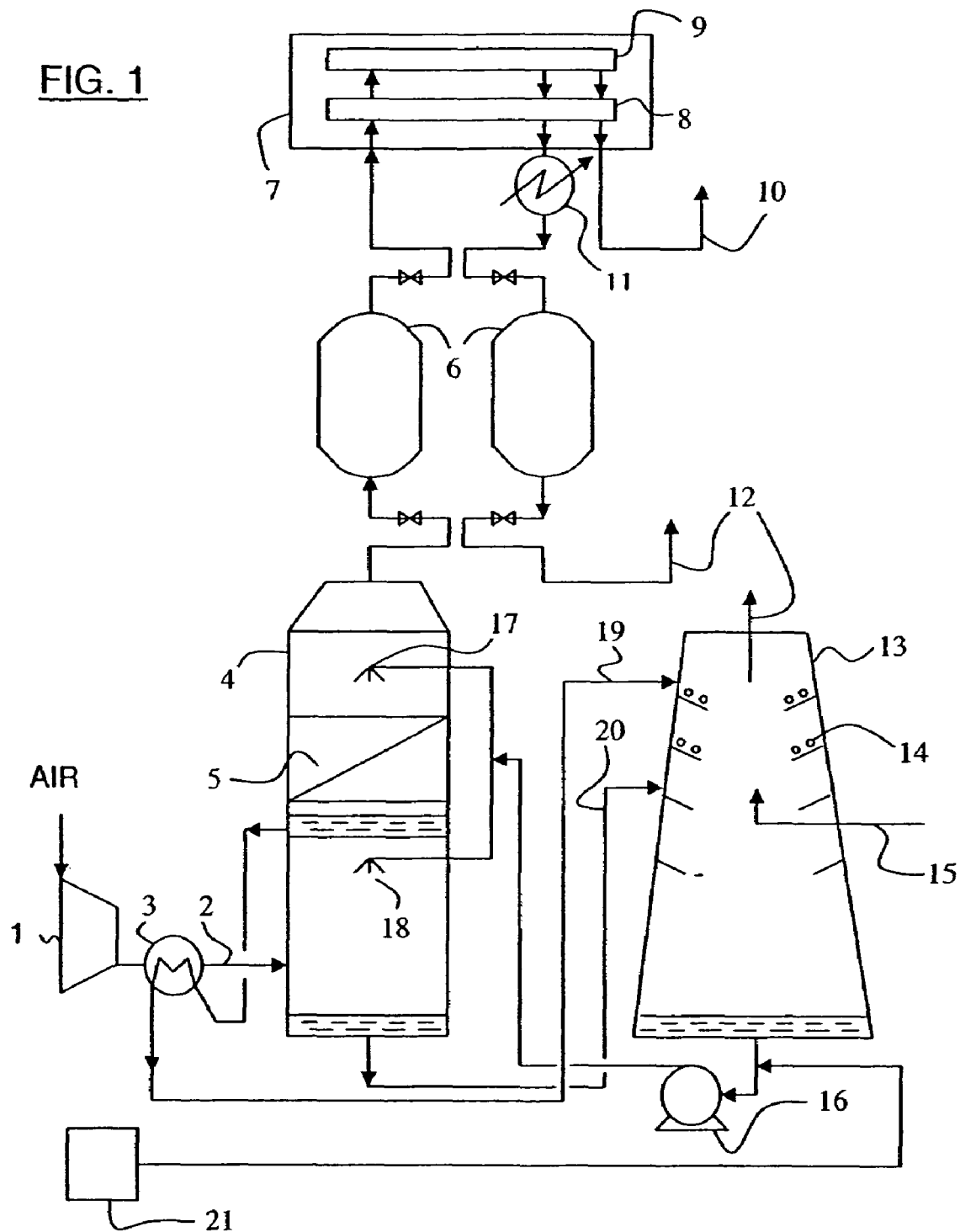
FIG. 1 shows an installation for the distillation of air according to a first preferred embodiment of the invention.

The installation shown in FIG. 1 is preferably used in a variety of production facilities, for producing oxygen and/or nitrogen by fractioning air and/or another gas containing $CO_2$.

Equipment for Producing the Air to be Treated

The installation shown in FIG. 1 includes a principal air compressor 1 in the discharge 2 of which is mounted a heat exchanger 3. The compressed air is often hot when fed to the spray tower, and in preferred embodiments has a temperature of about 80° C. However, the compressed air may also be provided at numerous other temperatures.

Spray Tower

There is also provided a spray tower 4, which receives the hot compressed air from the compressor 1, the air having been optionally pre-cooled in the heat exchanger 3. Preferably, the spray tower 4 is in fluid communication with the discharge of the heat exchanger 3. The spray tower 4 is preferably a dual stage spray 17+18 refrigeration tower 4, but alternatively, is provided with a multitude of stages and/or inlet spray nozzles at various locations throughout the tower. The spray tower may also be designed as a packed tower or another type of tower known in the art. The spray tower 4 both refrigerates and treats the incoming compressed air. Accordingly, spray inlets 17+18 are provided for spraying a cooling solvent therein. The cooling solvent contacts the compressed air in order to both cool the air and to provide a medium into which the $CO_2$ contained in the air may dissolve.

The spray tower 4 is also equipped with catalyzing means for catalyzing the hydration reaction of $CO_2$ into at least bicarbonate and hydrogen ions. Preferably, the catalyzing means include a biocatalytic packing 5. The biocatalyst immobilized on a packing promotes the conversion of $CO_2$ and water into bicarbonate and hydrogen ions (carbonic acid). Passing through the biocatalytic packing, the $CO_2$ contained in the compressed air is dissolved at the compressed air high pressure in the form of bicarbonate ions in the sprayed cooling water. The spray tower 4 may also be provided with catalyzing means chosen from absorptive chemical reagents, such as amine-based liquids provided in the aqueous cooling solvent or solid sorbents fixed on a packing or an interior surface of the spray tower 4. The catalyzing means cooperate with the cooling solvent and the $CO_2$-containing hot compressed air to synergistically provide treated air that contains a reduced amount of $CO_2$ and has been cooled. This double preparation (cooling and reduction of $CO_2$) is advantageous for the fractionation of the treated air.

Referring to FIG. 1, when the hot compressed air first enters the bottom of the spray tower 4, the cooling solvent sprayed from the lower spray nozzle 18 initially contacts and quenches it. The bottom of the spray tower is hotter than the top. Preferably, the spray tower 4 is provided with a top stage and a bottom stage. The bottom stage is preferably not provided with a biocatalyst, especially if the temperature therein would hinder or destroy the biocatalyst. However, if the air is pre-cooled to an adequately low temperature, then the bottom stage may be provided with biocatalyst. Moreover, the bottom stage may be provided with catalyzing means, such as an absorptive chemical reagent, that presents adequate heat resistance while enabling the hydration reaction of $CO_2$. In any case, as the compressed air rises through the spray tower 4, being cooled by the cooling solvent, the $CO_2$ therein becomes more soluble in the cooling solvent. The cooling solvent that collects in the bottom of the dual stage spray tower 4 is a weak ion solution, as it was principally used to cool the incoming hot compressed air, and the dissolution of $CO_2$ was not as favoured as in the top of the spray tower 4. It is preferable that this weak ion solution is directly fed to the percolation cooling tower. Depending on its temperature and concentration, the weak ion solution is fed into an appropriate stage and/or height of the percolation cooling tower, which will be further discussed herebelow.

The substantially cooled compressed air enters the top stage and contacts the cooling solvent sprayed from the top nozzle 17. Preferably, the top stage is provided with a biocatalytic or enzymatic packing, but may also be provided with other catalyzing means to catalyze the hydration of $CO_2$. The cooling solvent sprayed from the top nozzle 17 continues to cool the incoming air and also enables the substantial dissolution of $CO_2$ therein. Accordingly, an ion rich solution collects at the base of the top stage. Preferably, this ion rich solution is removed from the spray tower 4 at the top stage level and is fed into a regenerator 22, as shown in FIG. 2.

Figure 2:
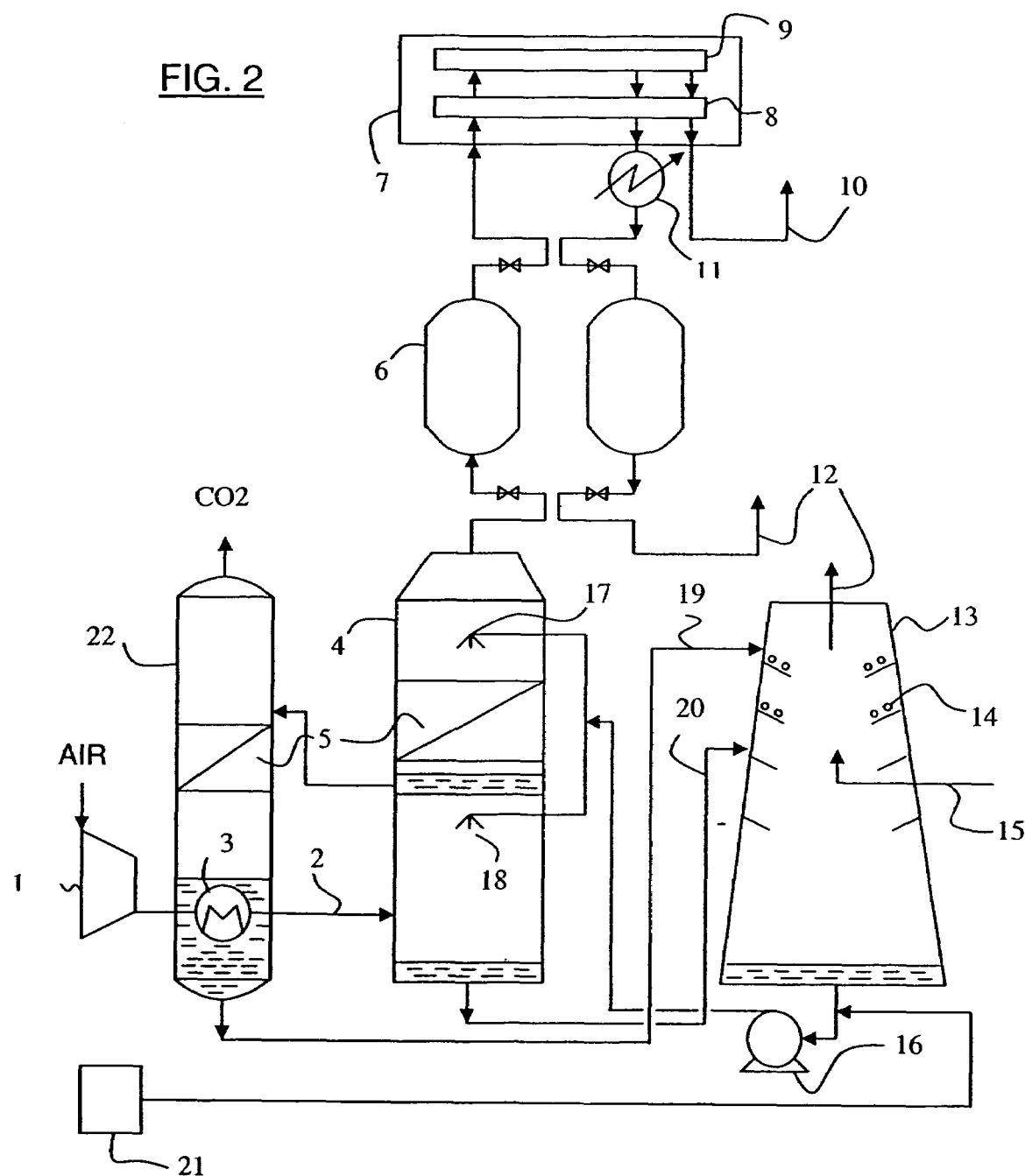
FIG. 2 shows a second preferred embodiment of the invention, including a regenerator column and its re-boiler for $CO_2$ removal.

A particularly preferred embodiment of the spray tower is a dual stage spray cooling tower, as shown in FIGS. 1 and 2. The dual stage spray tower presents some notable advantages, among which are the following:

(a) quenching of the hot air or gas to temperatures below 65° C., as higher temperatures can otherwise be detrimental to the biocatalyst;

(b) an improved efficiency of the biocatalyst at lower temperatures; and (c) separating the ion rich solution from the bulk of the cooling solvent (i.e. cooling water), enabling very efficient regeneration of the ion rich solution through a regenerator unit, as shown in FIG. 2.

The spray tower 4 may also be designed to have more than two stages, each stage being designed so that the entire tower may efficiently remove $CO_2$ from the incoming compressed air. Accordingly, each stage may be provided with specific features chosen from the following: catalyzing means (biocatalyst, chemical, etc.), cooling solvent (temperature, flow rate, chemical composition, etc.), physical characteristics (packing, height, etc.) and outlet or recycle streams.

The spray tower 4 is preferably a water spray cooling tower, featuring an immobilized bioctalyst or a biocatalytic packing 5, for both decreasing the temperature of the compressed gas and removing the bulk of its carbon dioxide content.

Adsorption Equipment

In a preferred embodiment, two adsorption chambers 6, which operate alternatively, are also provided. Other adsorption equipment known to a person skilled in the art may also be used. The treated air exiting the spray tower preferably enters the adsorption chambers 6 to have the residual amounts of $CO_2$ removed therefrom.

One of the important advantages of the present invention is that it allows for substantial size reduction of molecular sieve/activated alumina adsorbent vessels in new grass-root units as well as reduced energy consumption, or allows for improved performance of downstream existing adsorbent vessels with minimized capital investment in existing units.

Fractionation Equipment

In order to fraction the treated air into desired components, a distillation apparatus 7 (also called a distillation cold box) is provided. It preferably contains a principal heat exchange line 8 and an apparatus 9 for the distillation of air, which can be a double distillation column producing particularly oxygen, or else a simple distillation column producing nitrogen. There is also provided a conduit and a heater, which can be electrical or fired for the heating of residual gas from the distillation apparatus, leaving the warm end of the heat exchange line 8 and connecting, through a heater 11 into one of the chambers 6, which is in the regeneration phase.

A production line 10 leaving the warm end of the heat exchange line is also provided, along with exhaust lines to the atmosphere 12.

Regeneration Equipment

Numerous regeneration units may be used to regenerate the cooling solvent. According to preferred embodiments, a percolation cooling tower and a regenerator are used to regenerate the solvent. Alternatively the ion rich solution may be employed directly or subjected to an ion-exchange resin or any method to immobilize or precipitate the bicarbonate ions.

In one embodiment, as shown in FIG. 1, the rich ion solution flow exiting the spray tower 4 is directed to a heat exchanger 3 at the outlet of the air compressor in order to increase its temperature and promote the conversion, at atmospheric pressure of the bicarbonate back to water and $CO_2$.

Preferably, a percolation cooling tower 13 is provided and is preferably equipped with biocatalytic or enzymatic packing 14 and cooled by natural atmospheric air convection 15. The ion rich solution, which has been heated to promote ion conversion at atmospheric pressure back into $CO_2$ and water, is fed to the percolation tower 13 through a discharge line 19 and brought to atmospheric pressure and a high temperature. When in contact with the biocatalytic packing 14, the ions contained in the solution are released in the form of gaseous $CO_2$, which exits the system into the atmosphere through the exhaust 12. The ion lean water cooling solution continues its cooling to ambient temperature through the percolation tower by contact with atmospheric air circulating counter-currently by natural convection, to produce the regenerated cooling solvent. The ions are converted back to $CO_2$ and water at lower pressure and higher temperature and released to the atmosphere.

A water circulation pump 16 (also called a recycle pump) capable of recycling the cooled water at system pressure to the dual spray nozzles 17 and 18 is preferably provided at the base of the percolation tower. Also, a hot ion rich solution discharge line 19, feeds the percolation tower 13 with ion rich solution. Preferably, a hot ion lean solution discharge line 20, feeds the percolation tower at a lower entry level. The ion rich solution and the ion lean solution (also called weak ion solution) are withdrawn from different stages of the spray tower, and fed to a stage of the percolation cooling tower according to its concentration and temperature. The regenerated cooling solvent (which is preferably a cold ion lean water solution) is then recycled through the circulation pump 16 above system pressure to the spray cooling tower 4. Fresh water 21 is added upstream of the water circulation pump in order to compensate for the natural evaporation losses in the percolation tower 13. There is thus provided a fresh water make-up source 21, tapping into the recycle line containing the regenerated cooling solvent, upstream of the recycle pump 16.

The installation shown in FIG. 2 preferably includes the same equipment, with the addition of a regenerator tower 22 in lieu of simply a heat exchanger 3, for efficient regeneration of the ion rich solution, using the heat of the compressed gas through a re-boiler 22, which can be mounted either inside the column as shown on FIG. 2 or externally. This embodiment allows for a much improved $CO_2$ recovery from the ion rich solution. Re-boiling is insured through the heat exchanger 3, which can be fitted either inside the regenerator 22 or externally. The regenerator is preferably in the form of a column and may be provided with a plurality of stages and liquid inlets. The regenerator 22 is preferably equipped with the same biocatalytic packing which catalyses the reverse reaction from bicarbonate ions to gaseous $CO_2$, at lower pressure and higher temperature. The lean solution exiting the regenerator is still sent to the percolation tower 13 for further cooling and $CO_2$ release to atmosphere. This preferred embodiment is particularly appropriate for bigger units and installations.

By using the compressed air to heat the heat exchanger 3 or reboiler, the installation may capitalize on the otherwise lost compression heat in order to release the $CO_2$ to the atmosphere and regenerate the cooling solvent.

The Process

The process for fractioning air containing $CO_2$ includes certain steps which will be described herebelow. It should be noted that a variety of preferred steps may be incorporated within the process, in order to further heat, cool, regenerate or purify the various liquid and gas streams. Some of these preferred steps will be discussed herebelow.

Step a)

The first step of the process according to the present invention is providing compressed air. Referring to FIG. 1, this step may be performed by means of an air compressor 1. The compressor also has an outlet 2. Depending on design and operating parameters, the air may be compressed to a variety of pressures. Preferably, the compressed air has a pressure between about 5 and about 30 absolute bars. Alternatively the compressed air may have a different pressure, especially if the subsequent units are operated at corresponding high or low pressures.

The air fed to the compressor 1 is preferably atmospheric air, containing standard amounts of oxygen, nitrogen, $CO_2$ and other minor components. Alternatively, the air fed to the compressor includes, for example, effluent gas having an elevated concentration of $CO_2$. This alternative is particularly suited when the process for fractioning air is coupled with another process that has a gaseous product containing oxygen and/or nitrogen with an undesirable quantity of $CO_2$.

Preferred Pre-Cooling Step

In a preferred embodiment of the process, the compressed air containing $CO_2$ is subjected to a pre-cooling step. The compressed air is hot upon exiting the compressor 1 and may be pre-cooled before entering subsequent processing units. The means for pre-cooling the compressed air may take on a variety of embodiments, as for example, a heat exchanger 3. The cooling fluid of the heat exchanger 3 preferably includes a stream that requires heating. Preferably, the compressed air is pre-cooled from a temperature in the range of about 80° C. to 150° C., to a temperature below 80° C.

Step b)

This step of the process includes simultaneaously cooling the compressed air and reducing the amount of $CO_2$ contained therein. This step is performed, first of all, by providing a spray tower 4. The compressed air is fed from the outlet 2 of the compressor to the spray tower 4. The spray tower 4 may have a variety of preferred features and embodiments. The spray tower 4 is provided downstream from the compressor 1, and as the case may be, downstream from the pre-cooling means.

The spray tower 4 is provided with catalyzing means 5 for chemically promoting the hydration reaction of dissolved $CO_2$ into at least bicarbonate ions and hydrogen ions, thereby producing treated air with a reduced amount of $CO_2$ and an ion rich solution containing at least bicarbonate ions and hydrogen ions. The hydration reaction occurs substantially within the spray tower 4.

Preferably, the catalyzing means 5 are selected from a biocatalyst and absorptive chemical reagents. The catalyzing means promote the hydration reaction of $CO_2$ and water into ions. On one hand, the catalyzing means may be a biocatalyst or a combination of one or several chemical components that do not enter into the reaction equation. On the other hand, the catalyzing means may be a reagent that chemically promotes the absorption of $CO_2$ by entering into the reaction equation, often by striping water of a hydrogen ion.

In a preferred aspect of the process, the biocatalyst is provided and is immobilized on a packing 5, the packing preferably being mounted within the spray tower 4. A variety of packings may be suitable, and may have porous or non-porous surfaces as well as a variety of forms (rings, saddles, etc.). Also preferably, the biocatalyst includes carbonic anhydrase, which catalyses the hydration reaction of $CO_2$ into bicarbonate and hydrogen ions. The design of the spray cooling tower 4 is preferably such that the contact temperature of the entering compressed air and the biocatalyst is at 65° C. or lower.

In another preferred aspect of the process, one or more absorptive chemical reagents are used either in conjunction with the biocatalyst or alone to catalyze the hydration of $CO_2$ into ions.

This process step also includes feeding the compressed air into the spray tower 4 while spraying a cooling solvent therein. Preferably the spray tower 4 is provided with two stages, namely a top and a bottom stage. Preferably, the compressed air is fed into the bottom of the spray tower and the liquid solvent is fed into at least one spray nozzle 17+18 at the top of the spray tower or at the top of each stage. Alternatively, the solvent may be sprayed into the spray tower by other techniques known in the art. For example, the solvent may be sprayed at any location along the top and/or sides of the spray tower 4. Furthermore, the spray nozzle may produce a fine spray, a spray including large droplets and/or a spray having substantial streams, depending on design and operating conditions. Preferably, the flow rate of the sprayed solvent may be controlled with valves or other mechanical or electrical means.

The compressed air is preferably fed into the bottom of the spray tower 4 in order enable a controlled distribution of the gas within the spray tower 4 and in relation to the flow of the cooling solvent. Thus the air and cooling solvent preferably flow counter-currently. The counter-current flow, on one hand, improves the mass transfer of dissolved $CO_2$ from the air into the cooling solvent, and on the other hand, promotes the heat transfer from the warm air to the cold solvent. Furthermore, as will be discussed herebelow, the invention provides mass transfer and heat transfer within the spray tower 4 that give rise to synergistic effects.

The hot compressed air is fed into the spray tower 4, while a cooling solvent is sprayed therein. The cooling solvent is provided at a temperature to cool the hot compressed air. The cooling solvent is fed into the spray tower 4 and contacts the compressed air, thereby simultaneously cooling the air and enabling $CO_2$ to be dissolved. Of course, the temperature difference between the compressed air and the solvent may be adjusted by other sub-steps, such as pre-cooling steps, pre-heating steps and/or other temperature control techniques.

Also, depending on the catalyzing means, different optimum temperatures (among other conditions) may be desired to promote hydration reactions.

As the ions are dissolved into the cooling solvent, an ion rich solution is produced. The ion rich solution includes at least bicarbonate and hydrogen ions, but may also include a variety of other ions resulting from the hydration reactions.

The absorptive chemical reagents are preferably added to the cooling solvent and are sprayed into the spray tower 4. Alternatively, the reagents may be sprayed separately into the spray tower or may be provided as solid sorbents bonded to a packing or an interior surface of the spray tower. Accordingly, a variety of absorptive chemical reagents may be employed in a variety of ways. For example, when mono-, di- or tri-amines are used, they are preferably dissolved in the aqueous solvent in order to circulate with the solvent throughout the process and thus are not restricted to the internal cavity of the spray tower 4. Alternatively, when the reagents are solid sorbents such as amine enriched solids (for example, amines surface-bonded to silica gel or a porous support) the reagents may remain substantially within the spray tower 4. Furthermore, when removing the $CO_2$ from the air by hydration reactions, these absorptive chemical reagents may yield a variety of ionic compounds. For example, when using monoethanol amine, the following preferred reversible reaction occurs:

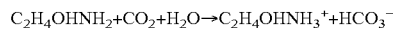

$$C_2H_4OHNH_2 + CO_2 + H_2O \rightarrow C_2H_4OHNH_3^+ + HCO_3^-$$

Likewise, if other absorptive chemical reagents are used to react with water and $CO_2$, their corresponding ions may be produced and thus be dissolved in the ion rich solution.

The cooperation between the cooling solvent, the catalyzing means and the compressed air, yields treated air. The treated air, on one hand, contains a significantly lower concentration of $CO_2$ and, on the other hand, has been cooled in preparation for subsequent processing steps, such as cold distillation. It should also be noted that the simultaneous cooling and hydration reactions cooperate in a synergistic fashion, as low temperatures both pre-cool the compressed air and cause the equilibrium of the hydration reaction to favour the conversion of $CO_2$ into at least bicarbonate and hydrogen ions. The mass transfer, heat transfer and reactions occurring in the inventive process thus enable synergistic, efficient and economical results.

The contact at high pressure between the cooling solvent and the air, at working pressure, in the presence of a biocatalyst and/or the additives present in the solvent causes the bulk transfer of the $CO_2$ present in the air into the cooling water solution mainly in the form of bicarbonate and hydrogen ions. A removal efficiency comprised between 30% and 95% in volume of the incoming $CO_2$ is achieved, typically from 400-500 ppmV to less than 100 ppmV, depending on the operating conditions of the spray tower 4.

The cooling of the air has the additional effect of promoting the condensation of water out of the air, thereby decreasing the water contained in the air. This facilitates downstream fractioning steps, as the air should be dehydrated before being subjected to cold (also called "cryogenic") distillation.

Of course, the design of the spray tower 4 (for example, tower height, number of stages, type of packing, quantity and type of biocatalyst and/or absorptive chemical reagents, etc.) as well as the operating conditions (flow rates of air and solvent, temperature, pressure, etc.), may be adapted so that the amount of $CO_2$ in the treated air is minimized.

Preferable Adsorption Step

As is often the case, due to economic design and operation of the spray tower 4, small amounts of $CO_2$ remain in the treated air. It is often preferable to further remove $CO_2$ before fractioning the treated air. Therefore, in a preferred embodiment of the process, the treated air is fed into at least one adsorption chamber 6. Thus, the treated air is subjected to an adsorption step. The adsorption chamber 6 also enables further dehydration of the treated air, thereby removing unwanted water still present in the treated air.

Step c)

This step of the process includes feeding the treated air into a cold distillation apparatus 7 for fractioning the treated air into at least one gas selected from the group consisting of nitrogen and oxygen (as air is primarily composed of these two gases). Any cold distillation apparatuses known in the art may be used. The treated air provided at this step is preferably quite cold, as distillation of such gases occurs at cryogenic temperatures.

Preferable Post-Fractioning Steps

The fractioned oxygen and/or nitrogen are preferably fed to containment units. Alternatively, when the inventive process is incorporated within other processes requiring nitrogen or oxygen, in liquid or gas form, the latter may be fed directly into other process steps.

Preferable Regeneration/Recycling Steps

The ion solutions generated at at least one exit of the spray tower 4 are preferably regenerated to produce a regenerated cooling solvent.

Preferably the entirety of the ion rich solution is regenerated, but alternatively only a portion thereof is so treated. A variety of regeneration units may be employed, either in parallel or in series. For example, precipitating the bicarbonate ions in the form of at least one insoluble bicarbonate species or converting the ions back into $CO_2$ and water are preferable regeneration methods.

In a preferred embodiment, the regenerating step includes the sub-steps of:
(i) heating the solution to promote conversion of the ions back into at least $CO_2$ and water, to produce a weak ion solution; and,
(ii) cooling the weak ion solution, thereby producing a regenerated cooling solvent.

Referring to FIG. 1, the heating step (i) is performed in a heat exchanger 3 and the cooling step (ii) is performed in a percolation cooling tower 13. Preferably, the heating step (i) is performed in the heat exchanger 3 in which the hot compressed air is pre-cooled, in order to efficiently recycle the energy gained by the hot ion solution. In this embodiment, the ion rich solution is heated in the exchanger 3 and then fed into the top of the percolation cooling tower 13. The hot ion rich solution releases a large quantity of $CO_2$ at the top of the percolation cooling tower 13, and the $CO_2$ is purged into the atmosphere from the tower through a purge line 12. Alternatively, the $CO_2$ may be sent to other processing steps such as for producing dry ice or other $CO_2$ products.

When certain absorptive chemical reagents are converted into ionic form and dissolve in the ion rich solution within the spray tower 4, the above mentioned heating step may shift the equilibrium of the reaction to promote the conversion of the ions into the non-ionic reagent as well as $CO_2$ and water.

The percolation cooling tower 13 is preferably provided with a biocatalyst 14 to promote the conversion of the ions into $CO_2$ and water. The ion rich solution is fed into the percolation cooling tower while cooling air is also provided therein to cool the solution and produce a regenerated cooling solvent. This regenerating step may be enhanced by providing a biocatalytic or enzymatic packing 14 within the percolation cooling tower 13.

Referring to FIG. 2, which shows another preferred embodiment, at least a portion of the ion solution is fed to a regenerator 22 prior to the percolation cooling tower 13. Alternatively, the regenerator 22 may be used alone to regenerate the solvent. The regenerator 22 and the percolation cooling tower 13 may be used in series to maximize the removal of the ions from the solution and improve the quality of the regenerated solvent, but may also be used in parallel or in an arrangement with other regeneration devices known to a person skilled in the art. It should be evident that a plurality of regeneration steps may be taken to precipitate ions, release $CO_2$ and/or provide a regenerated solvent to be recycled back into the process and thereby reduce costs and waste.

Preferably, the regenerator 22 receives an ion rich solution from the top stage of the spray tower 4, while the ion solution at the bottom stage is fed directly to the percolation cooling tower 13.

As mentioned above, the regenerated cooling solvent is preferably recycled back to the spray tower 4. Additionally, the regenerated solvent may be supplemented with fresh solvent from a source 21. Also, additional quantities of absorptive chemical reagents may be added prior to feeding the regenerated cooling solvent into the spray tower.

As can be appreciated, the process according to the invention preferably comprises one or several of the following characteristics:
- the $CO_2$ is absorbed in a single or dual stage spray cooling tower;
- the spray cooling tower features a biocatalytic packing with immobilized carbonic anhydrase enzyme;
- the spray cooling water solution contains additives (amine or any other compound known to increase $CO_2$ absorption and/or pH buffering) for enhanced performance and pH buffering;
- the spray cooling water solution contains significant levels of either mono, di or tertiary amines or any other known compound known and commonly used for $CO_2$ absorption;
- the ion rich solution is fed to a heat exchanger, using the heat from the compressed air and then to a percolation tower for the release of the absorbed $CO_2$ into the atmosphere;
- the ion rich solution is fed to a regenerator column, using the heat of compression of the process air to activate its re-boiling unit; and
- the ion rich solution is fed to precipitation unit for the recovery of $CO_2$ under the form of a carbonated species.

Some notable advantages of the invention result from the reduction in size and/or improved operation of the downstream adsorbent unit 6, which is highly dependent on the incoming $CO_2$ concentration for its operation and performance. Higher than presupposed $CO_2$ concentrations causes a reduction in cycle time and increased regeneration power needs in systems designed for lower $CO_2$ concentrations.

In the last fifteen years, a significant increase in atmospheric $CO_2$ concentrations has been noticed, especially in industrial areas. Absorbent units have usually been designed to remove around 300 ppmV, but in some areas, depending on weather conditions, actual peak concentrations have reached out to 500 ppmV or more, which strongly impact the performance of these units. The invention, especially in its simplest form, as presented in FIG. 1, allows for the less troublesome revamping of such units at minimal capital cost and continued operation with reduced energy consumption.

The process and installation, according to the present invention, enable the surprising and synergetic cooling off and reducing of the $CO_2$ in compressed air to be fractioned.

Of course, the present invention is not limited to the specific embodiments described hereabove and in the Figures, but extends to any process or installation having the inventive steps and/or components of the invention. Many modifications could be made without deviating from what has actually been invented.

The invention claimed is:

1. A process for fractioning air, comprising the steps of:
 a) providing compressed air;
 b) simultaneously cooling the compressed air and reducing $CO_2$ contained therein, by
  providing a spray tower;
  providing the spray tower with catalyzing means for promoting the hydration reaction of dissolved $CO_2$ into at least bicarbonate ions and hydrogen ions, thereby producing treated air with a reduced amount of $CO_2$ and an ion rich solution containing at least bicarbonate ions and hydrogen ions; and
  feeding the compressed air into the spray tower while spraying a cooling solvent therein;
 c) feeding the treated air to a cold distillation apparatus for fractioning the treated air into at least one gas selected from the group consisting of nitrogen and oxygen.

2. The process of claim 1, further comprising, after step b) and before step c), the step of:
 feeding the treated air into at least one adsorption chamber for dehydrating and/or further removing $CO_2$ from said treated air.

3. The process of claim 1, further comprising, after step b), the step of:
 regenerating the ion rich solution by the sub-steps of:
  (i) heating the solution to promote conversion of the ions back into at least $CO_2$ and water, to produce a weak ion solution, and
  (ii) cooling the weak ion solution, thereby producing a regenerated cooling solvent.

4. The process of claim 3, wherein step (i) is performed in a regenerator, wherein the CO2 released from the ion rich solution is purged from the regenerator.

5. The process of claim 4, wherein the regenerator is heated with the hot compressed air containing $CO_2$, thereby heating the ion rich solution and pre-cooling the hot compressed air before the latter is fed into the spray tower.

6. The process of claim 3, wherein step (ii) is performed in a percolation cooling tower, wherein cooling air is fed therein, to produce a regenerated cooling solvent.

7. The process of claim 6, wherein the regenerated cooling solvent is recycled back to the spray tower to be sprayed therein.

8. The process of claim 6, wherein the at least one of the regenerator and the percolation cooling tower is provided with at least one of an enzymatic packing and a biocatalytic packing to promote conversion of the ions back into $CO_2$ and water.

9. The process of claim 6, wherein the regenerator and the percolation cooling tower operate at pressures lower than a pressure of the compressed air.

10. The process of claim 1, wherein the catalysing means for promoting the hydration reaction of dissolved $CO_2$ are chosen from a biocatalyst immobilized within the spray tower and absorptive chemical agents.

11. The process of claim 1, wherein the spray tower further comprises a bottom stage and a top stage, a first spray inlet and a second spray inlet for spraying the cooling solvent into the respective stages, the top stage being provided with the catalyzing means, step b) of the process comprising the sub-step of:

initially cooling the compressed air with the cooling solvent of the first spray inlet in the bottom stage, thereby producing a pre-treated air and a weak ion solution at a first liquid outlet, and
 cooling the pre-treated air while removing $CO_2$ therefrom with the cooling solvent of the second spray inlet in the top stage, the catalyzing means promoting the hydration reaction of $CO_2$, thereby producing the treated air with a reduced amount of $CO_2$ and the ion rich solution at a second liquid outlet.

12. An installation for fractioning air, comprising:
 a compressor for compressing the air to produce compressed air;
 a spray tower for simultaneously cooling the compressed air and reducing $CO_2$ contained therein, the spray tower having an air inlet for receiving the compressed air, at least one liquid spray inlet for receiving and spraying a cooling solvent to contact and cool the compressed air; the spray tower also comprising catalyzing means for promoting the hydration reaction of dissolved $CO_2$ into at least bicarbonate ions and hydrogen ions, thereby producing treated air having a reduced amount of CO2 at a gas outlet, and an ion rich solution at at least one liquid outlet;
 a cold distillation apparatus for receiving the treated air, the cold distillation apparatus fractioning the treated air into at least one gas selected from the group consisting of nitrogen and oxygen.

13. The installation of claim 12, further comprising:
 at least one adsorption chamber in fluid communication with the gas outlet of the spray tower, for receiving the treated air, the adsorption chamber dehydrating and/or further removing the $CO_2$ from the treated air.

14. The installation of claim 12, further comprising:
 a heat exchanger for receiving and heating the ion rich solution exiting the spray tower, while receiving and pre-cooling the compressed air exiting the compressor.

15. The installation of claim 12, further comprising:
 a percolation cooling tower for receiving and regenerating the ion rich solution, the percolation cooling tower having a gas outlet for purging the $CO_2$ released from the ion rich solution, an air inlet for receiving cooling air to cool the ion rich solution and a liquid outlet for removing the regenerated cooling solvent.

16. The installation of claim 15, further comprising:
 a regenerator having a liquid inlet in fluid communication with the liquid outlet of the spray tower, the regenerator comprising a reboiler for heating the ion rich solution to promote the conversion of the ions into $CO_2$ and water, thereby producing a weak ion solution, a gas outlet for purging the $CO_2$ gas from the regenerator, and a liquid outlet for releasing the weak ion solution to be treated in the percolation cooling tower.

17. The installation of claim 16, wherein the at least one of the regenerator and the percolation cooling tower is provided with at least one of an enzymatic packing and a biocatalytic packing to promote conversion of the ions back into $CO_2$ and water.

18. The installation of claim 16, wherein the spray tower further comprises a bottom stage and a top stage, the bottom stage comprising:
 a gas inlet for receiving the compressed air;
 a first spray inlet for spraying the cooling solvent into the bottom stage to cool the compressed air and remove $CO_2$ therefrom, thereby producing a pre-treated air and a weak ion solution; and
 a first liquid outlet for removing the weak ion solution; and the top stage comprising:
  a second spray inlet for spraying the cooling solvent into the top stage;
  the catalyzing means for promoting the hydration reaction of dissolved $CO_2$ into at least bicarbonate ions and hydrogen ions, thereby producing the treated air and the ion rich solution; and
  a second liquid outlet for removing the ion rich solution.

19. The installation of claim 18, wherein the first liquid outlet is in fluid communication with the percolation cooling tower for directly feeding the weak ion solution thereto, and the second liquid outlet is in fluid communication with the regenerator for feeding the ion rich solution thereto.

20. The installation of claim 12, wherein the catalyzing means for promoting the hydration reaction of dissolved $CO_2$ are chosen from a biocatalyst immobilized within the spray tower and absorptive chemical reagents.

* * * * *

UNITED STATES PATENT AND TRADEMARK OFFICE
CERTIFICATE OF CORRECTION

PATENT NO.       : 7,514,056 B2                                      Page 1 of 1
APPLICATION NO.  : 11/350288
DATED            : April 7, 2009
INVENTOR(S)      : S. Fradette et al.

It is certified that error appears in the above-identified patent and that said Letters Patent is hereby corrected as shown below:

Title Pg, Item (56) "U.S. PATENT DOCUMENTS", please correct the date of five of the patent documents as follows:

After "6,475,382 B2" please delete "11/2002" and insert --6/2002-- therefor.
After "6,602,703 B2" please delete "8/2003" and insert --4/2003-- therefor.
After "6,846,584 B2" please delete "1/2005" and insert --2/2003-- therefor.
After "6,908,507 B2" please delete "6/2005" and insert --7/2004-- therefor.
After "6,946,288 B2" please delete "9/2005" and insert --12/2003-- therefor.

In column 2 at line 46, please delete "CO2" and insert --$CO_2$-- therefor.

In column 11 at line 37 (claim 4, line 2), please delete "CO2" and insert --$CO_2$-- therefor.

In column 12 at line 22 (claim 12, line 12), please delete "CO2" and insert --$CO_2$-- therefor.

Signed and Sealed this

Second Day of June, 2009

JOHN DOLL
*Acting Director of the United States Patent and Trademark Office*